(12) United States Patent
Maruyama et al.

(10) Patent No.: US 12,025,327 B2
(45) Date of Patent: *Jul. 2, 2024

(54) ENERGY EFFICIENCY AND COMFORT OPTIMIZATION THROUGH EXTREME WEATHER ADAPTIVITY AND AI

(71) Applicant: EnerAllies, Inc., Los Altos, CA (US)

(72) Inventors: Stephen C. Maruyama, Aptos, CA (US); Robert S. Keil, Los Altos, CA (US)

(73) Assignee: EnerAllies, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,144

(22) Filed: Jan. 30, 2023

(65) Prior Publication Data

US 2023/0175722 A1 Jun. 8, 2023

Related U.S. Application Data

(63) Continuation of application No. 16/773,803, filed on Jan. 27, 2020, now Pat. No. 11,592,199.
(Continued)

(51) Int. Cl.
*F24F 11/30* (2018.01)
*F24F 11/52* (2018.01)
(Continued)

(52) U.S. Cl.
CPC .............. *F24F 11/30* (2018.01); *F24F 11/52* (2018.01); *F24F 11/64* (2018.01); *F24F 11/65* (2018.01);
(Continued)

(58) Field of Classification Search
CPC .................... F24F 2130/10; G05B 13/0265
See application file for complete search history.

(56) References Cited

U.S. PATENT DOCUMENTS

2010/0289643 A1 11/2010 Trundle et al.
2013/0035774 A1* 2/2013 Warren ............... A01G 25/167
700/90
(Continued)

*Primary Examiner* — Nathan L Laughlin
(74) *Attorney, Agent, or Firm* — Hickman Becker Bingham Ledesma LLP

(57) ABSTRACT

Techniques for providing an adaptive energy management system for responding to extreme weather conditions are described herein. In an embodiment, a server computer stores multiple policy datasets each representing HVAC control policy for different structure locations and one or more extreme weather conditions. The server computer receives weather condition data comprising a condition identifier of a then-current extreme weather condition in association with a location identifier specifying a particular geographical region. Based on the location identifier, a particular structure location, being within the particular geographic region, is identified. Based on the particular structure location, a particular policy dataset from among the policy datasets is identified. The particular policy dataset is transformed into HVAC equipment instructions, which the server computer transmits, over a network, to HVAC equipment at the particular structure location which, when executed, cause the HVAC equipment to execute an action in accordance with the particular policy dataset.

18 Claims, 5 Drawing Sheets

Related U.S. Application Data

(60) Provisional application No. 62/797,871, filed on Jan. 28, 2019.

(51) Int. Cl.
| | |
|---|---|
| *F24F 11/64* | (2018.01) |
| *F24F 11/65* | (2018.01) |
| *G05B 13/02* | (2006.01) |
| *F24F 130/10* | (2018.01) |
| *F24F 140/50* | (2018.01) |
| *F24F 140/60* | (2018.01) |

(52) U.S. Cl.
CPC ...... *G05B 13/0265* (2013.01); *F24F 2130/10* (2018.01); *F24F 2140/50* (2018.01); *F24F 2140/60* (2018.01)

(56) References Cited

U.S. PATENT DOCUMENTS

| | | |
|---|---|---|
| 2015/0032264 A1 | 1/2015 | Emmons et al. |
| 2015/0325096 A1 | 11/2015 | Hatch |
| 2015/0339570 A1* | 11/2015 | Scheffler ................. G06N 3/04 706/27 |
| 2016/0209059 A1 | 7/2016 | Castillo et al. |
| 2016/0334811 A1 | 11/2016 | Marten |
| 2017/0234562 A1 | 8/2017 | Ribbich et al. |
| 2019/0163215 A1 | 5/2019 | Cheng et al. |
| 2020/0300495 A1* | 9/2020 | Kingetsu ................. F24F 11/64 |

* cited by examiner

ENERGY EFFICIENCY AND COMFORT OPTIMIZATION THROUGH EXTREME WEATHER ADAPTIVITY AND AI

BENEFIT CLAIM

This application claims the benefit as a Continuation of application Ser. No. 16/773,803, filed Jan. 27, 2020; which claims the benefit under 35 U.S.C. § 119 of provisional application 62/797,871, filed Jan. 28, 2019, the entire contents of which are incorporated by reference as if fully disclosed herein.

FIELD OF THE DISCLOSURE

The present disclosure relates to energy management computer programs, computer systems, and computer-assisted solutions. The disclosure relates more specifically to a networked, cloud-based energy management computer system that provides for centralized management and control of multiple energy management devices located at a plurality of sites, and forecast-based scheduling of thermostats managed by the multiple energy management devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Energy costs typically represent one of the largest ongoing expenses associated with a business enterprise's commercial leases. As a result, business enterprises and other institutions are increasingly looking to some form of automated energy management solution in an attempt to monitor and reduce costs associated with energy usage at commercially operated sites, while still maintaining the premises at temperature levels that are appropriate for workers and the then-current weather, climate and/or season.

For business enterprises such as small footprint retail and food service chains that may operate a large number of sites across a wide geographic area, past energy management solutions have had serious shortcomings. For example, according to industry studies, only a small percentage of small footprint commercial sites are automated with a computer-based energy management system. Instead, the vast majority of commercial sites are equipped with outdated manual or programmable thermostats that typically require configuration and management by a local site manager or other employees. However, a typical site manager is often saddled with a variety of other job responsibilities that leave few resources to properly configure and manage thermostats and other energy management devices for optimal energy usage. The financial implications of this mismanagement are potentially considerable, particularly for enterprises that control hundreds or thousands of sites.

Of the commercial sites that have an energy management system, these systems are typically implemented as costly, custom-designed solutions that target individual site locations and are often bundled with expensive professional services to maintain the systems. The prior energy management approaches have been a poor fit for business enterprises that manage a large number of small footprint sites by failing to provide a scalable energy management system that provides centralized control of an enterprise's energy management devices across multiple sites, and that enables valuable analysis and insight into an enterprise's energy usage across site boundaries in order to optimize energy usage.

In terms of energy usage optimization, sites at various locations may have different responsive needs for extreme weather conditions. For instance, locations that store perishable items or pets may have minimum energy usage needs that exceed locations which merely store hardware. In cases of extreme weather conditions, it may be difficult or impossible for a person to be physically present at a site in order to respond to extreme weather conditions.

Thus, there is a need for a system which can identify extreme weather conditions and implement energy management policies for different types of locations in response to the extreme weather conditions.

SUMMARY

The appended claims may serve as a summary of the disclosure.

DETAILED DESCRIPTION

Figure 1:
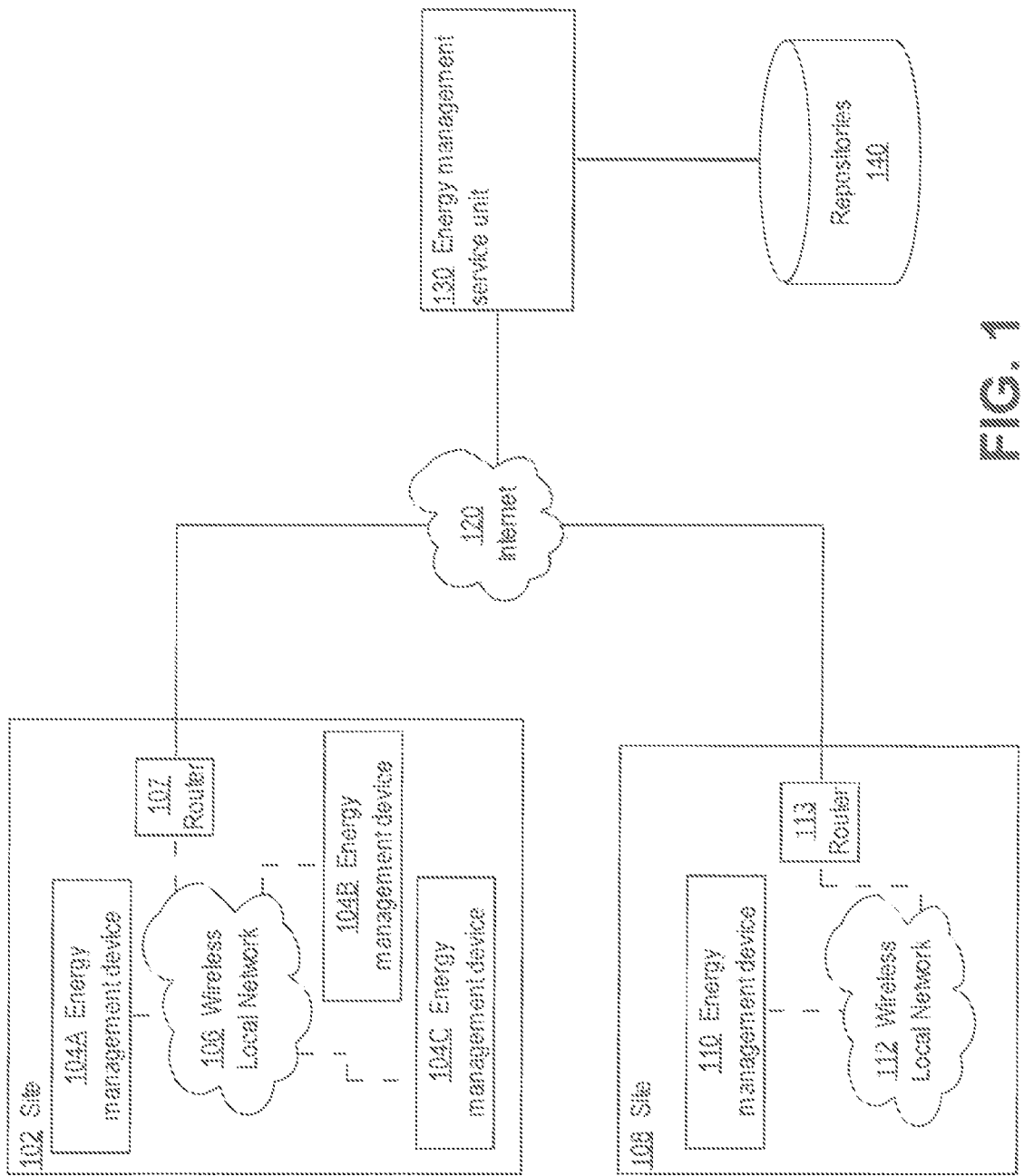
FIG. 1 is a block diagram that illustrates an overview of an energy management system that includes an energy management service unit in relation to a plurality of sites that each includes one or more energy management devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 System Overview
  3.0 Example Implementation of Energy Management System
    3.1 Energy Management Devices
    3.2 Energy Management Platform
      3.2.1 Data Collection
      3.2.2 Energy Management Portal
      3.2.3 Site Groupings
      3.2.4 Energy Management Applications
  4.0 Implementation Mechanisms—Hardware Overview

1.0 General Overview

Systems and methods for providing an adaptive energy management system for responding to extreme weather conditions are described herein. In an embodiment, an energy management system stores a plurality of energy usage policies which include extreme weather condition policies defining energy usage for one or more locations in cases of one or more extreme weather conditions. The system receives forecast data from an external server computer and determines that a particular site is likely to be affected by an extreme weather condition. In response, the system sends instructions to an on-site energy management device which causes the device to implement the energy usage policy for the extreme weather condition.

In an embodiment, a method comprises storing, at a server computer, multiple different policy datasets each representing HVAC control policy for a plurality of different structure locations and one or more different extreme weather conditions; receiving weather condition data comprising a condition identifier of a then-current extreme weather condition in association with a location identifier specifying a particular geographical region; based on the location identifier, identifying a particular structure location from among the plurality of different structure locations, the particular structure location being within the particular geographic region; based on the particular structure location, selecting a particular policy dataset from among the policy datasets; transforming the particular policy dataset into a plurality of specific HVAC equipment instructions, based on stored HVAC configuration data specifying equipment types of HVAC equipment at the particular structure location; transmitting, over a network, the specific HVAC equipment instructions to HVAC equipment at the particular structure location which, when executed, cause the HVAC equipment at the particular structure location to execute a heating action, cooling action or fan action in accordance with the particular policy.

2.0 System Overview

One embodiment incorporates an energy management system based on a distributed computer-based architecture that includes networked energy management devices located at a plurality of sites and a collection of energy management computer program applications and modules implemented by a centralized energy management service unit. In an embodiment, the energy management program applications and modules are responsible for facilitating customer access to the system and collecting, storing, and analyzing energy management data collected from the devices at the plurality of sites. In an embodiment, the energy management system is adaptable to a wide variety of energy usage requirements and enables customers accessing the system to configure energy management devices using scheduling templates, to define and customize site groupings for device configuration and data analysis purposes, and to request and view various statistical views of collected energy usage data.

In this context, energy management devices are devices that are configured to control and/or monitor one or more energy consuming commercial appliances such as, for example, heating, ventilation, and air conditioning (HVAC) units, lighting units, water pumps, and refrigeration units. In various embodiments, energy management devices may include any of programmable thermostats, power outlet control devices, lighting control devices, refrigeration control devices, motion detection devices, sub-metering devices, water resource management devices, waste management devices, renewable energy management devices, and any combination thereof. In an embodiment, the energy management devices are configured to collect data relating to energy usage or other operating conditions associated with an appliance under the device's control and to send the data to a centralized energy management service unit.

In an embodiment, one or more of the energy management devices may comprise a programmable wireless communications subsystem that enables the devices to communicate with the centralized energy management service unit over one or more wireless or wireline communications networks. In an embodiment, the programmable wireless communications subsystem is implemented using the Wi-Fi wireless communication standard. The use of the Wi-Fi wireless standard in energy management devices provides numerous benefits such as, for example, enabling the devices to wirelessly connect to the Internet without a dedicated gateway device. These and other factors may significantly decrease the costs of system implementation.

In an embodiment, a centralized energy management service unit is coupled to an internetwork or wide area network and is configured to provide a World Wide Web-based management interface, or portal, that enables users to securely access and configure various aspects of the system. For example, users may interact with the portal to configure site groupings, define device scheduling templates, and request various statistical views of collected energy usage data for display in one or more dashboard-like interfaces. The energy management service unit is configured so that, based on various user profiles, the portal may securely control access to application programs and stored energy management data to various users within a customer company, to third-party users that may have a business relation with one or more customers, and to users associated with different customers, who may be competitors. In one embodiment, the energy management service unit may include an application programming interface (API) that enables third-party users to access controlled views of collected energy usage data.

FIG. 1 is a block diagram that illustrates an overview of an energy management system that includes an energy management service unit in relation to a plurality of sites that each includes one or more energy management devices. In this context, a site generally refers to a small footprint building such as a retail store or other commercial building controlled by a customer of the energy management system provider. In an embodiment, sites 102, 108 are coupled through routers 107, 113, respectively, to the Internet 120, and through the Internet 120 to an energy management service unit 130.

In an embodiment, site 102 comprises one or more energy management devices wirelessly coupled to a wireless local network 106 that has connectivity to the Internet 120. For example, site 102 includes three energy management devices 104A-104C. Each of energy management devices 104A-104C may represent a different type of energy management device, or may represent the same type of energy management device as another device located in a different area of site 102. Each of the energy management devices 104A-104C may communicate over wireless local network 106 using wireless connections such as, for example, using the Wi-Fi communication standard. For example, router 107 may comprise a wireless access point that facilitates communication between any wireless energy management devices and the Internet 120. In some embodiments router 107 may be the same router that is used for communication with other computer devices at the site, such as point of sale terminals, inventory computers, or special-purpose computers; in other words, embodiments of the systems and solutions described herein do not require a dedicated router, but can use available bandwidth of a router that is already installed at the site for other purposes.

In an embodiment, one or more wireless energy management devices at site 102 may be configured to communicate directly with one or more other energy management devices. For example, one or more of energy management devices 104A-104C may be configured to communicate directly with other devices using the Wi-Fi Direct protocol or other similar peer-to-peer communication standard. While certain embodiments are described in connection with wireless communication, wired communication or a combination may be used in other embodiments. Direct communication between devices may enable the addition of energy management devices at more locations within site 102 resulting in more detailed energy usage data collection.

Similar to site 102, site 108 includes an energy management device 110. Energy management device 110 is coupled to wireless local network 112 that has connectivity to the Internet 120. Site 108 may be located in a geographically remote location from site 102. For the purposes of illustrating a clear example, FIG. 1 shows only two sites and four energy management devices; however, practical embodiments may include any number of sites and any number of energy management devices located at each site.

Internet 120 may comprise a plurality of public internetworks providing connectivity between sites 102, 108 and energy management device 110. In an embodiment, Internet 120 may comprise a private point-to-point connection of a site to the energy management service unit 130. For example, a client computing device located at site 102 could use the public Internet to connect to energy management service unit 130 for system configuration and reporting purposes, but a private point-to-point connection may be provided for the collection of data from energy management devices 104A-104C. For example, a point-to-point connection could be implemented using an Internet Protocol Security (IPsec) network tunnel or other mechanism providing a secure connection over which collected data may be transmitted. In an embodiment, the secure connection may be made compliant with the Payment Card Industry (PCI) security standards such that the collected data may be transmitted over the same network elements and through network firewalls used by various sites to securely transmit credit cardholder information.

Energy management service unit 130 comprises an energy management platform and a collection of energy management applications and modules, each of which is detailed in other sections below. In general, the energy management applications and modules of energy management service unit 130 are configured to perform energy management device data collection, enable customers to access and manage the energy management system, and provide analysis of collected energy management data.

In an embodiment, energy management service unit 130 is coupled to data repositories 140 which stores collected energy management data, externally collected data, user information, site groupings, scheduling templates, and other data elements utilized by energy management service unit 130 as further described herein. Repositories 140 broadly represent one or more data repositories and various divisions of data collected and stored by the system may be implemented in different embodiments.

3.0 Example Implementation of Energy Management System

Figure 2:
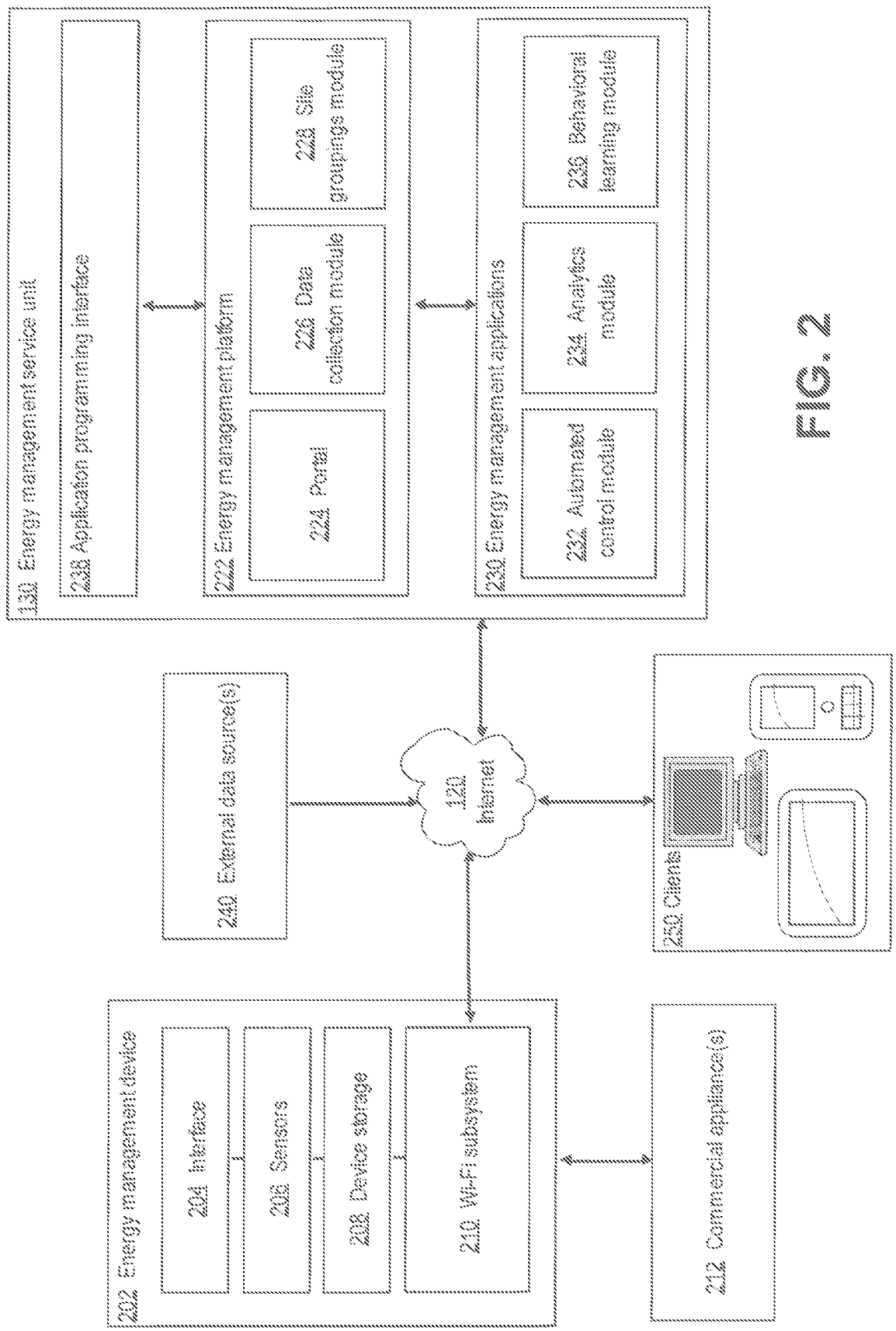
FIG. 2 is a block diagram that illustrates one embodiment of an energy management computer architecture including an example energy management device and an energy management service unit.

FIG. 2 is a block diagram that illustrates one embodiment of an energy management computer architecture including an example energy management device and an energy management service unit. The various components of FIG. 2 illustrate a system architecture that includes computerized, intelligent energy management devices such as energy management device 202, an energy management platform 222, and a collection of energy management applications 230 that provide for a comprehensive energy management system. Each of energy management platform 222 and energy management applications 230 may be implemented, in various embodiments, as one or more computer programs, code segments, scripts, configuration files, firmware, hardware logic, special-purpose computers, or a combination thereof.

3.1 Energy Management Devices

Referring now to FIG. 2, in an embodiment, energy management device 202 represents an example device that may be deployed at a particular site, so that all devices at the site could be similarly structured, in one embodiment. In an embodiment, an energy management device 202 may comprise an interface 204, one or more sensors 206, device storage 208, and a Wi-Fi subsystem 210. In an embodiment, an energy management device 202 may be mechanically, electrically, or communicatively coupled to one or more commercial appliances 212 for the purposes of controlling the operation of the appliances and/or collecting operating information associated with the appliances to send to energy management service unit 130. The particular approach for coupling, controlling and collecting are not critical.

In an embodiment, interface 204 provides user access to various configuration settings and operating information associated with an energy management device 202 directly at the device. For example, interface 204 may comprise various interface controls that enable a user to configure one or more settings associated with one or more associated commercial appliances 212. Interface 204 may further comprise one or more displays that report operating information associated with commercial appliances 212. As an example, a commercial appliance 212 may be an HVAC unit and interface 204 may provide interface controls that enable a user to configure desired temperature setpoints and that display current temperature conditions and setpoints. Touchscreens, pushbuttons, and similar devices may be used as the interface 204.

In an embodiment, an energy management device 202 may include one or more device sensors 206. Sensors 206 may be configured to detect one or more external or internal conditions associated with the operation of an energy management device 202 or an associated commercial appliance 212. For example, a thermostat device may include one or more sensors 206 configured to detect current temperature and/or humidity conditions or other information associated with the performance of an associated HVAC system. As another example, sensors 206 in a lighting control device may be configured to detect and report current lighting settings in one or more associated lighting devices.

In an embodiment, an energy management device 202 comprises device storage 208. Device storage 208 may store local device configuration settings, scheduling templates, and data collected by sensors 206. Device storage 208 may provide a mechanism for persistent storage of configuration settings and other information in the event of a power failure or communications failure rendering energy management device 202 unable to communicate with energy management service unit 130. For example, in one embodiment, device storage 208 may comprise a flash memory storage chip or other form of persistent data storage.

In an embodiment, an energy management device 202 comprises a Wi-Fi subsystem 210. Wi-Fi subsystem 210 may include programmable logic that is configured to override and/or supplement firmware or other logic included in an energy management device 202. In an embodiment, the logic in Wi-Fi subsystem 210 may be configured to enable customized control of various aspects of an energy management device 202, to send and receive data from energy management service unit 130, or perform other functions that are not natively provided by energy management device 202.

In an embodiment, Wi-Fi subsystem 210 may comprise various components including a Wi-Fi radio, a processor, and computer memory. In one embodiment, the Wi-Fi subsystem 210 may be incorporated directly into an energy management device 202, or may be included as a separate plug-in device.

In an embodiment, Wi-Fi subsystem 210 is configured to communicate with energy management service unit 130 over the Internet 120, as described above. Communication between Wi-Fi subsystem 210 and energy management service unit may comprise sending energy usage data associated with a commercial appliance 212, sending data detected by sensors 206, and sending energy management device 202 usage and configuration settings. Wi-Fi subsystem 210 may also be configured to receive scheduling templates and other device configuration data from energy management service unit 130, as further described herein. For example, assuming energy management device 202 is a programmable thermostat, Wi-Fi subsystem 210 may be configured to periodically send data to energy management service unit 130 over the Internet 120 including current temperature setpoints, device programming and configuration settings, and other data related to the operation of energy management device 202 and/or a commercial appliance 212.

In an embodiment, a programmable thermostat may initially include firmware or other controllers that include logic to control interface 204 and other operations of the thermostat. In an embodiment, Wi-Fi subsystem 210 may include additional logic programmed to override and/or supplement various aspects of the device firmware logic including restricting user access to particular interface 204 controls and implementing other device configuration changes responsive to communication received from energy management service unit 130. In an embodiment, Wi-Fi subsystem 210 may be configured to receive and cause installation of updated device firmware.

For example, Wi-Fi subsystem 210 may include logic configured to send "last gasp" messages to energy management service unit 130 in the event of an energy management device 202 losing power. In another embodiment, Wi-Fi subsystem 210 may include logic that enables a remote user to manage device calibration and detect calibration errors associated with energy management device 202.

3.2 Energy Management Platform

In an embodiment, energy management service unit 130 comprises an energy management platform 222, energy management applications 230, and application programming interface (API) 238. In an embodiment, the energy management platform 222 comprises a portal 224, data collection module 226, and site groupings module 228, each module described further in the sections below. The modules illustrated in FIG. 2 are provided as examples, and energy management service unit 130 may comprise any number of additional modules including logging, system administration, and other modules or sub-modules.

3.2.1 Data Collection

In an embodiment, data collection module 226 comprises program code and other logic configured to collect and store data from energy management devices and other external data sources. For example, data collected from energy management devices may include energy usage data and energy management device operation and configuration data. Data collection module 226 may also collect and store data from one or more external data sources 240 including, for example, weather data, customer data, and utilities information. In an embodiment, data collection module 226 may store collected data in one or more databases accessible to other modules of energy management service unit 130.

In one embodiment, data collection may be initiated by logic included in an energy management device 202, as described above, the logic configured to periodically or continuously send data collected by the device to data collection module 226. In this manner, data collection module 226 may receive the data sent from the energy management devices and store the data in a data repository. The data received by data collection module 226 may be stored along with one or more identifiers that identify the particular device sending the data, the site at which the sending device is located, and a time the data is sent or received.

In another embodiment, data collection may be initiated by data collection module 226 by sending a collection request to an energy management device 202 at desired time intervals. An energy management device 202 may be configured an energy management device 202 may be configured, in response to receiving a collection request, to collect and transmit the requested data to data collection module 226. Data collection preferences may be defined, in an embodiment, as part of a scheduling template or other device configuration data stored on an energy management device 202 and/or configured by a user using portal 224.

In an embodiment, data collected from an energy management device 202 may include any number of status parameters detected by the device. For example, collected parameters may include temperatures, humidity, HVAC mode, HVAC status, heating and cooling setpoints, fan operation modes, energy saving modes, setpoint overrides, setpoint holds, and heartbeats.

In an embodiment, data collection module 226 may collect information from one or more external data sources 240. As an example, external data sources 240 may include a weather service that provides information such as current temperatures, daily maximum and minimum temperatures, precipitation, weather forecasts, and other weather-related information. As another example, external data sources 240 may include data stored in a customer database such as, for example, utility billing information, utility tariff rates (including time of use rates), demand response program information and associated pricing information, and utility rebate program information. In another embodiment, external data sources 240 may include customer sales information, or other customer site-related information. In an embodiment, information collected from external data sources 240 may be used in conjunction with collected energy usage data to more accurately and advantageously program device templates for particular customers and to provide more detailed analyses of customer energy usage.

In an embodiment, data collection module 226, and other energy management service unit 130 modules, may interface with energy management devices using an application programming interface (services API) that implements particular energy management device functions. With this approach, energy management devices can be modified without affecting the modules at energy management service unit 130, and likewise, energy management service unit 130 may be modified without affecting logic implemented at the energy management devices.

3.2.2 Energy Management Portal

In an embodiment, energy management platform 222 comprises a graphical user interface and associated operating programs, termed portal 224, configured to generate and cause display of a management interface comprising one or more informational dashboards, configuration pages, and other interfaces that facilitate user interaction with the energy management system. In an embodiment, portal 224 may be accessed using a computer such as client machine 250. Client machine 250 may be located on the same local network as an energy management device 202, energy management service unit 130, or on any other network communicable with Internet 120.

In an embodiment, client 250 generally includes any computing device capable of requesting services over a network and includes, for example, personal computers, workstations, laptop computers, netbook computers, smartphones, and tablet computers. As an example, client 250 may comprise a browser that can access HTML documents generated by portal 224. In one embodiment, a client 250 may be integrated into an energy management device 202.

In one embodiment, portal 224 may generate displays that are customized for particular devices. For example, in response to requests for similar information, portal 224 may generate one display in response to detecting that client 250 is a smartphone, and a second display in response to detecting that client 250 is a personal computer. In an embodiment, the generation of informational dashboards, configuration pages, and other displays may be customized for more effective display depending on various characteristics of the client device including, for example, screen size and resolution, processing power, presence of a touch user interface, and connection bandwidth.

In one embodiment, portal 224 may control access to the energy management system based on user access credentials supplied by a user accessing portal 224. In an embodiment, each authorized user may be associated with a user profile that identifies the user's access level within the system. In an embodiment, a user's access level may include defining particular databases that the user may access and whether the user has permission to modify the data or read-only access.

In an embodiment, user profiles may be consistent with users' role in a company organization or other associated with other employment positions. For example, separate user profiles may be established for company executives, regional managers, site managers, or other classes of users. In other embodiments, other customized user profiles may be created for other purposes such as company-wide and system wide-administrators. As other examples, user profiles may be established for users associated with system support, HVAC installation and support, HVAC manufacturers, other users associated with retail or food services, users associated with a utility company, and other industry analysts. The association of users with particular user roles may be configured within a company by a corporate administrative user or by other designated system-wide administrative users.

For example, access levels may be configured such that a site manager may access information, device configurations, and analytics for the particular sites under the site manager's control, but not for the entire company. As another example, a regional manager may access information associated with a plurality sites that are associated with the manager's organizational responsibility. As yet another example, a corporate executive may access aggregated information of many companies in a geographic area or industry to analyze industry benchmarks.

In an embodiment, a user accessing portal 224 may define and configure various aspects of the energy management system in accordance with the user's profile and corresponding access levels. For example, a user may use portal 224 to configure one or more data collection configurations, scheduling templates, site groupings, statistical views, and other elements, as further described in other sections.

3.2.3 Site Groupings

In an embodiment, energy management service unit 130 comprises a site groupings module 228 responsible for implementing the creation and modification of site groupings. In this context, a site grouping is stored data representing a logical grouping of one or more physical, managed sites into a reusable collection that may be used for analysis, controlling user access, application of scheduling templates, and other system-wide purposes. In an embodiment, a site grouping may include any combination of sites and/or other defined site groupings. For example, one or more site groupings may be created that group sites located in each of a number of geographic regions, and a separate site grouping may be created that includes one or more of the geographic region site groupings. In an embodiment, site groupings may be configured by a user using portal 224 and configuration may include the user creating new site groupings, adding or removing one or more sites or other site groupings from an existing grouping, or deleting an existing grouping.

In an embodiment, site groupings may be created based on any number of characteristics including physical form, organizational or hierarchical structures used in non-energy management contexts, geographical regions, and associated users. For example, a corporate executive may desire to set up site groupings for tracking energy management spending for particular sites within the executive's company, grouped by various geographical regions and by regional managers that relate to sales, accounting, or other concepts. As another example, a site manager may desire tracking a site grouping that includes only the sites for which the site manager is responsible. Groups may be associated with financial concepts such as sales regions, territories, or other accounting units; geophysical entities or political units such as states, provinces, or countries; types of trade channels; demographic units; or any other grouping useful in management. Other examples of site grouping types that may be desired include site groupings associated with particular climate regions, particular utility regions, building types, store types (e.g., retail or food service), and HVAC manufacturers or models. For example, various utilities may have different energy usage pricing rates and the effect of the different pricing rates may be tracked across a number of site groupings. Different states may have different tariff rates that are tracked and compared by state site groupings. As another example, sites may be grouped based on climate types and may include sites that are located in disparate geographic regions but that share similar weather patterns.

In the examples, various site groupings may be created that include sites relevant to a users' configuration, monitoring, and/or reporting needs. Site groupings may additionally or alternatively be established in response to detection of an extreme weather condition. Sites may be grouped based on one or more of a customer's preferences, a region, a type of extreme weather condition, or a severity of an extreme weather condition.

In an embodiment, for security and other reasons, site groupings module 228 may maintain stored, persistent associations between stored user profiles and site groupings. In an embodiment, associations between site groupings and user profiles may be configured by a user with sufficient access credentials using portal 224. In an embodiment, users also may have varying levels of access to their assigned groupings. For example, a particular user may be responsible for customer support of a particular region of the country. The user for example, may then be associated with a site grouping that includes one or more sites from multiple companies but because the customer support user is not directly associated with the company, read-only access permission may be given to the energy usage data collected from the sites. This may prevent the customer support user from making unauthorized changes to configurations of scheduling templates and other settings associated with the sites in a grouping.

In an embodiment, site groupings module 228 may enable users with sufficient access to create system configurations for an entire site grouping. For example, a user may associate customized scheduling templates and alarm and reporting configurations with a particular site grouping to which the user has access.

In an embodiment, site groupings module may store one or more default site groupings, such as a grouping that includes all sites within a company, or automatic groupings by states or other characteristics. In an embodiment, a user may create new site groupings, modifying existing site groupings, or remove existing site groupings, using portal 224. For example, a user creating a new site grouping may be presented with a listing of all sites that the user has access to and be able to select one or more of the sites to create a new site grouping. As another example, a user may view all existing site groupings associated with the user and be able to select new sites to add to a grouping or to remove sites from a grouping. The creation and modification of site groupings may be accomplished using any number of user interface controls including dragging and dropping visual representations of sites into groups or creating site grouping lists.

Figure 3:
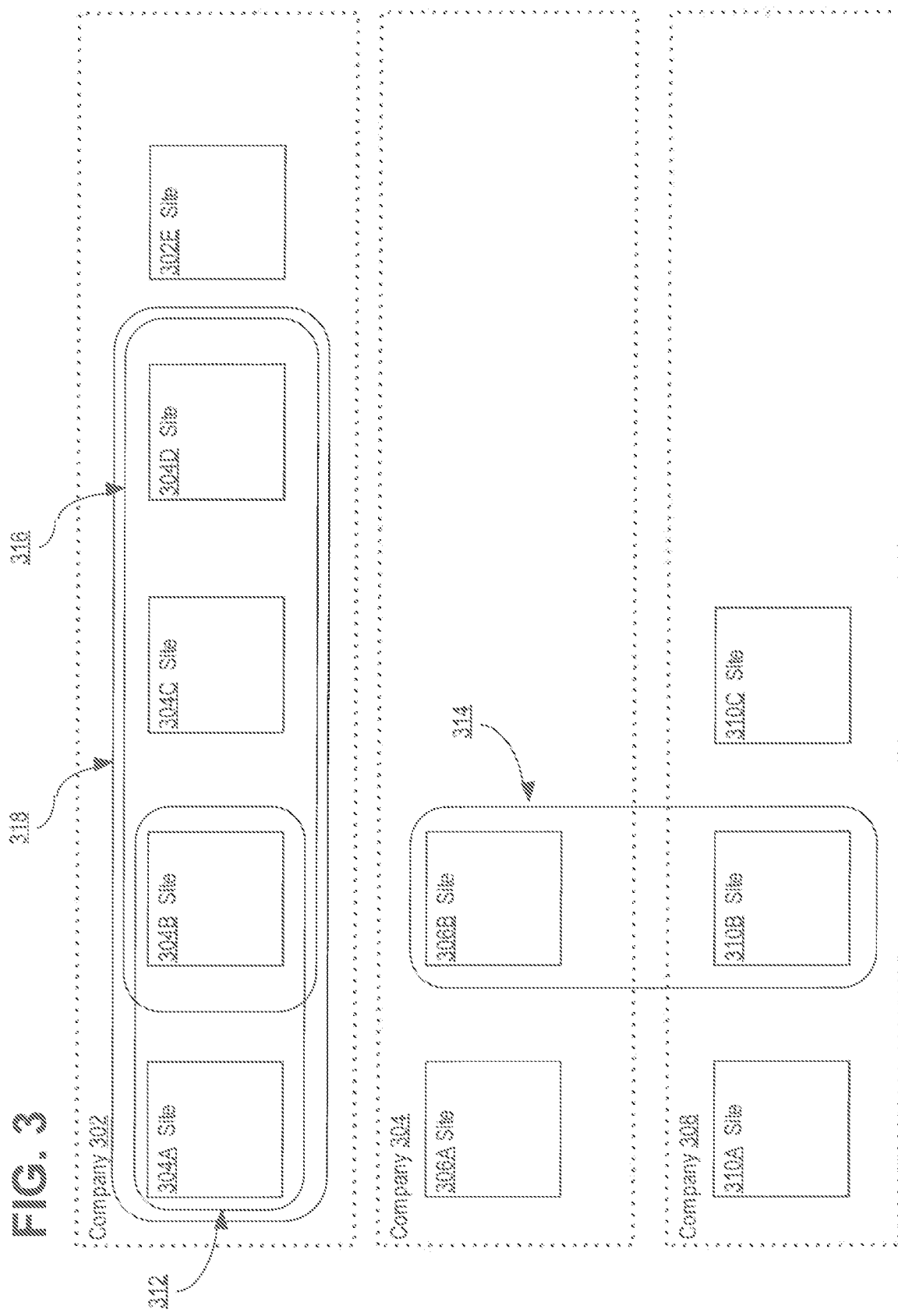
FIG. 3 is a block diagram that illustrates a representation of several example site groupings.

FIG. 3 is a block diagram that illustrates a representation of several example site groupings. Each of companies 302, 304, 308 may represent companies associated with different customers, different companies or company subsidiaries associated with the same customer, or any combination thereof.

Site groupings 312, 316, 318 represent three different site groupings within Company A. Site grouping 312 includes sites 302A, 302B, and may for example represent two sites for which a particular site manager is responsible. Alternatively, site groupings 312, 316 may represent two different regions that are overseen by two different regional managers. As shown by site 304B, a particular site may be included in any number of separate site groupings. For example, site 304B may be under the joint-responsibility of the regional manager responsible for site grouping 312 and the regional manager responsible for site grouping 316. Site grouping 318 illustrates a site grouping that includes two other site groupings, namely, site groupings 312, 316. In an embodiment, the system permits any arbitrary groupings of sites as fits customer requirements.

Site grouping 314 illustrates a site grouping that includes sites associated with each of companies 304, 308. For example, site grouping 314 may represent a grouping of sites that are located in a particular geographic region and that are under the responsibility of a third-party company responsible for servicing appliances at the selected sites. In the example, the third-party service company may be associated with grouping 314 and provided read-only access to the information in order to assess the need for service.

3.2.4 Energy Management Applications

Referring again to FIG. 2, in an embodiment, the energy management service unit 130 comprises various energy management applications 230 that interface with the energy management platform 222 components in order to provide automated control of customer energy management devices, analysis of collected data, and behavioral learning algorithms that leverage the data analysis to tune the operation of the system.

3.2.4.1 Automated Controls

In an embodiment, energy management service unit 130 comprises an automated control module 232 that operates in conjunction with site groupings module 228 to provide centralized configuration and control of a customer's energy management devices across any number of sites. In an embodiment, the automated control module 232 is configured to control energy management devices using one or more scheduling templates and to provide for the detection and reporting of various alarm conditions.

In one embodiment, automated control module 232 enables users to configure and deploy scheduling templates that control the operation of one or more energy management devices. In this context, a scheduling template refers to a configuration file or other data representation that defines one or more energy management device operating parameters to control the operation of one or more energy management devices. Example parameters include device operation settings based on a time of day, based on a yearly calendar, or based on a calendar following weekday, weekend, and holiday schedules. For example, a scheduling template for a thermostat device may define operating parameters that enable changing temperature cooling and heating setpoints, control fan operation, HVAC mode (heating, cooling, auto, and other modes), energy saving modes, setpoint holds, and device operation schedules. As another example, a scheduling template for a lighting control device may define schedules dictating when lights are to be powered on and off and associated lighting levels.

In an embodiment, a user may create, modify, and cause scheduling templates to be deployed to energy management devices using portal 224. For example, portal 224 may include a scheduling template configuration interface that enables users to specify desired scheduling template parameters and cause the configured scheduling templates to be deployed to one or more energy management devices. In an embodiment, a user may associate a particular scheduling template with an individual energy management device at a particular site, with all devices at a site, with sites in one or more site groupings, or across all devices within entire company. In an embodiment, a user may associate scheduling templates with areas within a particular site such as, for example, one scheduling template for energy management devices in a kitchen area, and another scheduling template for energy management devices in a dining room area. In an embodiment, logic in a Wi-Fi subsystem 210 is configured to receive scheduling templates sent from energy management service unit 130 and cause the scheduling template parameters to be implemented by energy management device 202.

In an embodiment, templates may also include feature templates. Feature templates may specify one or more particular device features that are available at a particular device, at devices within one or more sites, or at devices within one or more site groupings. In another embodiment, templates may include alarm templates that specify one or more alarms that are supported by a particular device, within one or more sites, or within one or more site groupings.

In an embodiment, automated control module 232 may include monitoring logic that detects if a deployed scheduling template has been over ridden at a local device. For example, a scheduling template with particular parameters may be deployed to an energy management device 202, and those particular parameters may be subsequently overridden, for example, by a user using interface 204. Automated control module 232 may detect that the deployed scheduling template parameters have been overridden based on received operating data sent by the device. In response to detecting that a scheduling template has been overridden locally at a device, automated control module 232 may cause the device to revert back to the scheduling template by sending an operating command to the device. In an embodiment, automated control module 232 may be configured to generate one or more system alarms and user notifications in response to detecting that a scheduling template is overridden locally at a device.

In an embodiment, automated control module 232 may comprise generic scheduling templates for various types of energy management devices for use as a starting point in configuring certain energy management device types. For example, automated control module 232 may store a generic scheduling template for each of a thermostat, intelligent electrical outlet devices, and a lighting control device. Automated control module 232 may also comprise one or more default scheduling templates for different business types that may be selected by a user and deployed to one or more devices. For example, a default scheduling template may be provided for retail chain stores another template for fast-food chains.

In an embodiment, automated control module 232 comprises a faults and alarms subsystem. In an embodiment, a fault condition may be detected by automated control module 232 and alarm may be generated based in response to one or more conditions detected at an individual site based on collected data including, for example, a temperature setting not being met, an energy management device failing to respond, or other defined fault conditions. In an embodiment, in response to automated control module 232 detecting the occurrence of a fault condition, one or more alarm messages may be generated and sent to designated users such as, for example, an email sent to a site manager, SMS message to a technician, or a visual alert displayed in portal 224 to particular users. In an embodiment, the faults and alarms subsystem is configured to identify various extreme weather conditions and their severity. The notification mechanism of the alarm subsystem may be used to notify customers and/or support agents of these conditions.

3.2.4.2 Analytics

In an embodiment, analytics module 234 mines the data collected by data collection module 226 across site groupings and is configured to provide statistical views detailing patterns in the data, also referred to herein as analytics. The statistical views generated by analytics module 234 may be used to understand historical energy usage patterns and trends in order to improve energy management performance across a customer's sites.

In this context, a statistical view comprises one or more data values generated from data collected and stored by data collection module 226 and using one or more statistical methods. In an embodiment, generated statistical views may be displayed to a user using portal 224 using any number of visual data representations including tables, spreadsheets, charts, graphs, or any other data representations. In an embodiment, one or more default statistical views may be stored by analytics module 234 and users may additionally specify one or more custom statistical views using portal 224. Statistical views specified by a particular user may be saved for later use by the user or for use by other users. In an embodiment, statistical views may be made available to users in a downloadable format that a user may download and store locally such as, for example, spreadsheet files, text documents, or in other file formats.

Analytics module 234 may generate statistical views of the collected data on a number of different levels including performance analyses of particular energy management devices, particular sites, site groupings, an entire company, and across companies and particular industries. Analyses performed by analytics module 234 on each of these levels may include statistics such as kilowatt and/or thermostat usage, degree days (heating and/or cooling), electrical dollars spent, natural gas or heating oil dollars spent, total dollars spent, inside and/or outside air temperatures, occupancy rates, and luminous rates. Statistical views may be generated based on various time granularities such as per hour, per day, per month, etc.

In an embodiment, analytics module 234 may generate an energy management device efficiency measurement. An efficiency measurement provides a measurement of the management of energy management devices by human behavior as compared to automated controls. In an embodiment, an energy management device efficiency measurement is measured as a percentage of how effectively energy management devices are being managed relative to fully automated controls, where 100% automation of an energy management device would be measured as 100% efficiency.

In one embodiment, analytics module 234 may generate statistical views of collected energy usage data based on site profile information such as, for example, the square footage of various sites, outside temperatures, and other site-specific information. In an embodiment, the site profile information may be used to generate statistical views that compare building efficiencies associated with various sites such as the average time required to reach certain temperatures, or the heat dissipation rate of particular sites.

In another embodiment, analytics module 234 may generate statistical views of energy usage data by comparing energy usage data collected across sites or site groupings within a particular company. For example, a statistical view may compare a particular site's kilowatt usage against the average of all company sites and/or the best company site, or compare a particular site's average inside and outside temperatures against the average inside and outside temperatures of various sites within the company.

In another embodiment, analytics module 234 may be configured to generate statistical views that are independent of company boundaries. For example, analytics module 234 may generate statistical views that compare a particular company's daily kilowatt usage or any other similar metric against an average generated for similar company types, for companies in similar geographic or climate regions, or across all companies.

In an embodiment, analytics module 234 may generate one or more predictive statistical views based on trends derived from the collected data. For example, a statistical view may be generated that calculates predictive savings based upon a calculated number of cooling and heating degree days in the past year. A heating or cooling day is a value based on the difference between the outside air temperature and a cooling or heating set point for a given day and may be used as an approximate measure of an HVAC unit's energy requirements. In the example, this figure may be used to estimate increases or decreases future energy bills based on recent cooling and heating day trends.

In an embodiment, analytics module 234 may generate statistical views that incorporate other data sets, such as data obtained from external data sources 240, in order to provide analyses of energy usage as it relates to other event data. For example, one or more statistical views may be defined that validate billing charges, generate billing reports, and generate other trending and statistical billing statistics based on stored utility billing information. In another embodiment, analytics module 234 may generate statistical views that compare temperature information recorded for a particular site with the sales information at the site, providing a customer with possible indications of the impact of temperature settings and resulting comfort levels at particular sites on purchasing habits, and enable customers to adjust their energy usage configurations accordingly.

In an embodiment, analytics module 234 may be configured to generate statistical views that represent data assets valuable to other entities that may not be energy management service customers. For example, an installer of HVAC units may desire information about performance statistics relating to various HVAC installations at particular sites serviced by the installer. As another example, the HVAC performance information may be valuable to various manufacturers of HVAC units for product development or advertisement purposes. Accordingly, in an embodiment, access to some statistical views may be provided to various non-customer entities as an auxiliary data service.

In an embodiment, third-party users may access various system components via API 238. In an embodiment, API 238 may provide controlled third-party access to various statistical views, collected energy usage data, device templates, and other information. In this manner, the data collected and stored in energy management service unit may be provided as a data asset to various third-parties including industry analysts, HVAC manufacturers, utility providers, and others.

3.2.4.3 Behavioral Learning

In an embodiment, energy management applications 230 further comprise a behavioral learning module 236 that includes set of algorithms that are based on learned behaviors. In this context, learned behaviors refer to inferences about user and energy management device behavior drawn from the data collected by data collection module 226. Learned behaviors detected by behavioral learning module 236 may be used assist users in further fine-tuning the control of scheduling template configurations, and to provide intelligent algorithms to control device operation. In an embodiment, learned behaviors may be further analyzed to determine company-wide and industry-wide best practices that may be used as benchmarks for energy efficiency in other modules across the system.

In an embodiment, one example behavioral learning algorithm that may be implemented by behavioral learning module 236 is a floating base temperature algorithm for thermostat devices. Rather than operating strictly according to specified heating and cooling setpoints, a floating base temperature algorithm allows the inside temperature setpoint set by particular thermostat device to fluctuate, or float, based on the outside temperature and the humidity index at the site at which the device is located.

As an example implementation of a floating base temperature algorithm, consider a thermostat device initially configured with a floating base temperature of 70 degrees and further configured to increase or decrease the inside temperature setpoint in response to corresponding increases and decreases in the outside temperature. Behavioral learning module 236 may program a rule, for example, in an scheduling template implemented by a thermostat device that that causes the thermostat device to increase the inside temperature setting in response to detecting that the outside temperature at the site exceeds a 20 degree difference from the inside temperature setting, with the thermostat device increasing the inside temperature setting one degree for every degree over the 20 degree difference. In an embodiment, a second rule may be programmed in the scheduling template that allows the inside temperature setting to increase only up to a maximum adjusted setting, for example, up to five degrees. In this example, if the outside temperature goes up to 93 degrees, the inside temperature setting will "float" upwards to 73 degrees. The inside temperature setting may continue to increase until the inside temperature reaches the set maximum of 75 degrees, in which case the second rule causes the thermostat device to hold at that temperature. In an embodiment, behavioral learning module 236 may implement floating base point algorithms based on fixed rules configured by a user for particular sites, or based on learned optimization points based on intercompany and/or industry wide comparable site analyses.

In another embodiment, behavioral learning module 236 may interface with portal 224 to present to a user various representations of temperatures settings other than degree numbers. For example, rather than presenting to a particular user using portal 224 an option to configure the temperature setting of a thermostat device to particular degree values, the user may be presented with a temperature scale that presents options that range from comfort at one end and energy cost savings at the other end. Behavioral learning module 236 may then translate a user's selection along the presented scale into an actual temperature value-based analyses performed about the cost to heat or cool a site to a particular temperature.

In another embodiment, behavioral learning module 236 may comprise an algorithm for pre-conditioning particular sites based on user settings. A pre-conditioning algorithm may include determining optimal device settings for pre-heating or pre-cooling a site to a desired temperature by a designated time. For example, a user may be aware of a particular time of day that customers or employees typically arrive at a particular site and desire that the site be cooled to a particular temperature by that time each day. In an embodiment, behavioral learning module 236 may determine a time that an energy management device 202 is to begin a cooling or heating operating based on historical data and determining an approximate time it takes to cool the site to the desired temperature. The determined time may be specified in a scheduling template sent to the thermostat device. In this manner, computation of pre-conditioning settings by behavioral learning module 236 prevents excess energy usage by a cooling or heating schedule being set too soon.

In another embodiment, behavioral learning module 236 is configured to implement various diagnostics and alarming algorithms based on analyzing statistical trending data. Behavioral learning module 236 may evaluate collected data associated with particular energy management devices, particular sites, or with an entire company. For example, in response to the detecting initiation of a particular temperature setting by a thermostat device at a particular site, behavioral learning module 236 may monitor the time period required heat or cool the site to the particular temperature setting. In an embodiment, behavioral learning module 236 may store this information and the information may be analyzed over time in order to evaluate the condition of an HVAC unit at the site. As the performance of the HVAC unit degrades over time, that degradation may be measured based on the time measurements and reported to the user. In other embodiments, HVAC degradation may be analyzed based on measuring overall unit run time, and actual usage of thermowatts and/or kilowatt hours. In an embodiment, an alarm may be set to alert the user that the HVAC is underperforming by a specified percentage relative a base point performance level.

In another embodiment, alarms may be detected and reported by behavioral learning module 236 based on the occurrence of particular short-term trending events. For example, behavioral learning module 236 may detect that at a particular site the time period to reach a particular temperature setting is exceptionally long, or that a particular site is unable to sustain a temperature because, for example, a window at the site is left open, or the HVAC unit is broken. In response to the detection of a specified alarm event, behavioral learning module 236 may be configured to generate a specified one or more user alerts.

3.2.4.4. Extreme Condition Profiles

In an embodiment, the energy management service unit 130 stores extreme condition profiles for one or more sites. The extreme condition profile for a site may identify an extreme weather condition and an override response. An extreme weather condition, as used herein, refers to an unexpected, unusual, unpredictable, severe, or unseasonable weather. Extreme weather conditions may include catastrophic events, such as wildfire, hurricane, tornados, flooding, and earthquakes, or extreme versions of normal weather events, such as extreme heat, extreme cold, large amounts of snow, hail, or rain, or any other environment-related event type. In an embodiment, multiple extreme condition profiles may be stored for different extreme conditions for a particular site. For example, a first profile may identify override responses for extreme heat, a second profile may identify override responses for extreme cold, and a third profile may identify override responses for catastrophic events.

In an embodiment, different sites within the same geographic region comprise different extreme condition profiles. For instance, the energy management service unit 130 may store extreme condition profiles for a plurality of different customers, locations, and/or devices. As an example, extreme conditions profiles may be stored for pet stores in a plurality of locations while different extreme condition profiles may be stored for a particular brand of restaurants for a plurality of locations. As the restaurants and pet stores may have different HVAC needs in times of extreme weather conditions, separate profiles may be applied to each location. Additionally, different devices and device locations may have different requirements. For instance, a kitchen thermostat at a site may have a different extreme condition profile than a dining room thermostat. Thus, the energy management service unit 130 may store data identifying sites to which each extreme condition profile corresponds.

The override responses comprise changes to control policies for a particular location in the case of extreme weather conditions. Examples include shutting off HVAC units during catastrophic events, making HVAC units inoperable during catastrophic events, switching from normal HVAC policies to identified unoccupied policies, increasing heating setpoints in extreme cold conditions, decreasing cooling setpoints in extreme heat conditions, and/or other overrides. In an embodiment, the overrides comprise replacement heating or cooling schedules. For example, if a schedule includes a minimum temperature of 78° and a maximum temperature of 82°, the override for catastrophic events for a particular group of sites may comprise a minimum temperature of 72° and a maximum temperature of 88°.

Extreme weather condition profiles may comprise additional gradations in the overrides. For example, overrides for extreme heat conditions may be set at different temperatures and/or perceived temperatures, such as windchill. For example, if an extreme heat profile may include a maximum temperature of 82° when the extreme heat condition exceeds a first temperature, but a maximum temperature of 80° when the extreme heat condition exceeds a second temperature. As another example, an extreme cold condition may include a first minimum temperature while the addition of snow to the extreme cold condition may include a second minimum temperature.

3.2.4.5. Extreme Weather Identification

In an embodiment, the energy management service unit 130 uses a learning algorithm and received forecast data to identify extreme weather conditions. For example, the energy management service unit 130 may utilize a logical regression model to compute probabilities of extreme events occurring based on a plurality of received forecasts from different data sources. By utilizing different sources of forecasts and a machine learning system, the energy management service unit 130 is able to account for both strengths and weaknesses of different forecasting techniques.

In an embodiment, the energy management service unit 130 initially collects previous forecasts from a plurality of sources. For example, the energy management service unit 130 may utilize APIs to request forecast data from different external server computers. Examples include FORECASTADVISOR, WEATHER.COM, and the National Weather Service. In an embodiment, the energy management service receives forecast data for a particular period of time, such as a year, the forecast data comprising an identifier of an event type, such as hurricane, wildfire, tornado, flooding, and extreme heat waves or cold fronts, a time at which the forecast was produced and/or made available, a time or period of time of the forecasted event, a physical location of the event, and/or a value indicating the intensity of the event, such as a temperature, an earthquake magnitude, a tornado level, a wind velocity, or other intensity indicator.

In an embodiment, the energy management service unit 130 additionally receives verification data indicating if forecasted events occurred, when the forecasted events occurred, where the forecasted events occurred, if events that weren't forecasted occurred, where the events that weren't forecasted occurred, and when the events that weren't forecasted occurred. The verification data may be received from one or more weather monitoring servers.

Additionally or alternatively, the verification data may be received from a plurality of separate verification sources. For example, the energy management service unit may use crowd sourcing to identify locations where and when events actually occurred. The crowd sourcing may be performed explicitly, such as through receipt of input from client computing devices specifying occurrence of events through a graphical user interface, or implicitly, such as through social media. For example, the energy management service unit 130 may receive a plurality of social media posts, each of which including data identifying a location of the post. The energy management service unit 130 may use linguistic analysis techniques to analyze the social media posts to determine if they identify the existence or non-existence of the forecasted weather event. Based on the social media posts, the energy management service unit 130 may determine a likelihood that the forecasted event actually occurred in a plurality of locations or is emerging or occurring in real-time at a faster rate, a slower rate, a stronger magnitude, or a weaker magnitude than forecasted or described. Additionally or alternatively, the system may receive aggregated social media information, such as trending data based on social media feeds.

In an embodiment, the energy management service unit 130 trains a machine learning system, such as a logical regression model, using the forecast data and the verification data. For example, the energy management service unit 130 may train the model with an input vector including a source of the forecast, a type of event, an amount of time between the forecast and the forecasted event, a location of the event, and/or an intensity of the event. The machine learning system may use the verification data to generate the outputs for training the machine learning system. For instance, for each forecasted event, an output vector may include whether the event occurred, a percentage of locations that the event was predicted to effect that the event actually effected, a percentage of times that the event was predicted to occur in that it actually occurred in, and/or a difference between a predicted intensity and an actual intensity.

By utilizing source of data in connection with other inputs, such as type of event, amount of time between forecast and forecasted event, location, or intensity, the machine learning system is able to capture the strengths and weaknesses of different forecast systems in identifying extreme weather conditions. For instance, a first source may be very good at forecasting hurricanes but poor at forecasting tornados while a second source may be significantly better at forecasting extreme weather conditions at long lead times. Through training of the machine learning system with inputs that include event type and forecast source, the system would be able to give higher weight to the first source for forecasts of hurricanes and lower weights for forecasts of tornados. Through training of the machine learning system with inputs that include lead time and forecast source, the system is able to give greater weight to the second source for forecasts with longer lead times than to other forecast sources. Additionally or alternatively, as the system continues to periodically receive weather data, the received weather data may be used to continually train and/or improve the machine learning system.

After the machine learning system has been trained, the energy management service unit 130 may compute the likelihood of an event happening at a particular location using the machine learning system. For example, the energy management service unit 130 may receive forecasts for the occurrence of an extreme weather condition from a plurality of sources. The energy management service unit 130 may use the inputs from the forecasts of source of the forecast, type of event, amount of time between the forecast and the forecasted event, location of the event, and/or intensity of the event to compute an output indicating a likelihood of occurrence of the event, likely error in location of the event, and/or likely error in time of the event. Using the computed probability or probabilities, the energy management service unit 130 may determine the likelihood of the event happening, the likelihood that the area of the event overlaps with a particular location, and/or the possible errors in time/intensity.

The energy management service unit 130 may cause display of the likelihoods on a client computing device associated with a particular site in the particular location. For example, the system may display a graphical user interface which depicts a plurality of different events and the likelihood of each of them occurring in a location that affects the particular site. The energy management service unit 130 may additionally cause display of an option to implement stored policies of an extreme condition profile associated with the particular site, thereby providing a likelihood of extreme weather conditions, providing options to implement policies for the extreme weather conditions, and implementing said policies with minimal data usage or input.

Additionally or alternatively, the energy management service unit 130 may automatically implement stored policies of an extreme condition profile in response to a computed probability of an extreme weather condition. For example, the energy management service unit 130 may determine that the probability of an extreme weather condition affecting a location at a particular time exceeds a stored threshold value and, in response, transmit instructions to equipment at the particular site to implement the stored polices of the extreme condition profile. The threshold value may be a predetermined value and/or a value set by an administrator through a graphical user interface executing on a client computing device. The system may additionally send a notification to a client computing device identifying the event type and indicating that the extreme weather condition profile was implemented. The notifications may indicate a predicted accuracy of the condition. For instance, if the system determines that the probability of an extreme weather condition is higher than a first threshold, such as 80%, the system may send the notification with a high priority indicator. If the probability of an extreme weather condition is lower than the first threshold but higher than a second threshold, such as 60%, the system may send the notification with a lower priority indicator.

Where a client computing device acts as an administrator for a plurality of different sites in different locations, a graphical user interface may be utilized to display likelihoods of various event types in various locations. For instance, the graphical user interface may include a grid with a plurality of rows each identifying a site location and a plurality of columns identifying probabilities of different types of extreme weather conditions. The graphical user interface may additionally include options next to each row for activating or deactivating extreme condition profiles for each site. The options may include a plurality of different extreme condition profiles if a plurality of different extreme profiles is stored.

In an embodiment, the client computing device displays a map which identifies extreme weather conditions for a plurality of locations. The indicators for extreme weather condition may vary based on condition type and/or predicted accuracy of the condition. For example, a first icon may indicate a wildfire in a first location while a second icon indicates a tornado in a second location. The icons may include different colors and/or levels of transparency based on the predicted accuracy of the condition. For example, if the predicted accuracy is low, the icon may be mostly transparent and/or a light color. If the predicted accuracy is high, the icon may be opaque and/or a dark color.

Additionally or alternatively, the energy management service unit 130 may cause display of only the profiles that are relevant to an identified event type. For example, if the energy management service unit 130 has stored an extreme heat profile, an extreme cold profile, and a catastrophic condition profile, the energy management service unit 130 may only cause display of an option to switch to the catastrophic condition profile for a particular row if the chances of extreme heat and extreme cold for that site are 0% and the chances of a tornado for the site is 60%. Thus, the energy management service unit 130 adapts to the likelihoods of different events by only displaying catastrophic condition profile options that have greater than a threshold chance of occurring. The threshold chance may be set low to present more options, such as at 20% likelihood.

3.2.5. Extreme Weather Adaptation Implementation

Figure 4:
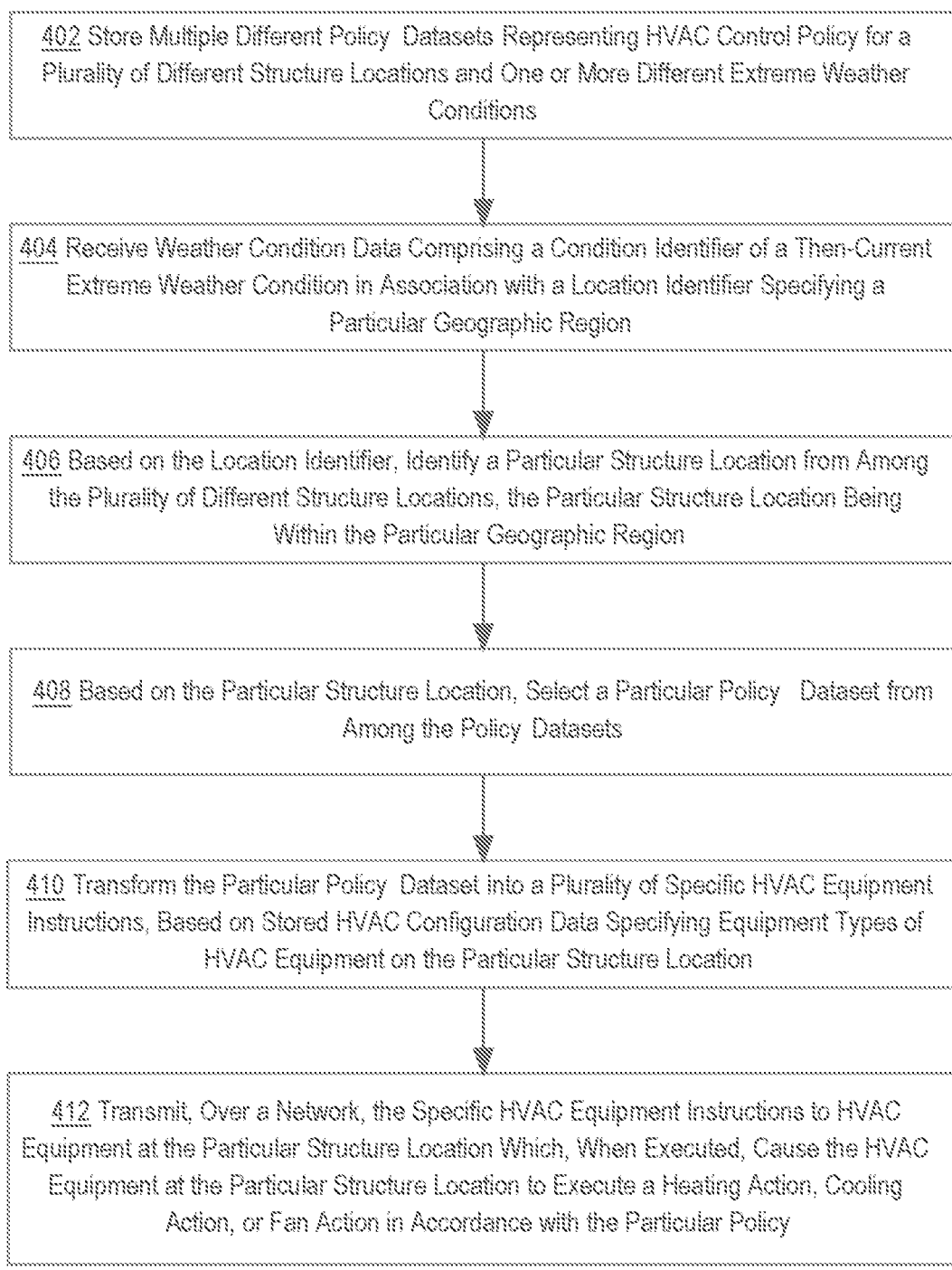
FIG. 4 depicts an example method of utilizing extreme condition profiles to adapt to extreme weather conditions.

In an embodiment, the energy management service unit 130 adapts to extreme weather conditions by transmitting instructions to equipment at affected locations to cause the equipment to implement stored extreme condition profiles during extreme weather conditions. FIG. 4 depicts an example method of utilizing extreme condition profiles to adapt to extreme weather conditions. While FIG. 4 describes an example using HVAC equipment, embodiments may additionally include lighting controls, refrigeration, and/or other energy-consuming appliances which may be turned on, turned off, or adjusted during extreme weather conditions.

At step 402, multiple different policy datasets representing HVAC control policy for a plurality of different structure locations and one or more different extreme weather conditions are stored. For example, the energy management service unit 130 may store different extreme weather condition policy datasets for different sites, different groups of sites such as sites corresponding to a single entity or sites in similar locations, different event types, different thermostats at a site, or any combination thereof. For instance, extreme weather condition policy datasets for a particular entity may include a first extreme weather condition profile for a site at a first location and first event type, a second extreme weather condition profile for a site at the first location and a second event type, and a third extreme weather condition profile for a site at a second location and the first event type. Alternatively, extreme weather condition policy datasets for a second entity may include only a single extreme weather condition profile which is used for all sites and one or more event types.

At step 404, the system receives weather condition data comprising a condition identifier of a then-current extreme weather condition in association with a location identifier specifying a particular geographic region. For example, the system may receive a forecast indicating occurrence of an upcoming extreme weather condition in a geographical region, such as a zip code, municipality, or set of physical coordinates. Additionally or alternatively, the system may receive a plurality of forecasts from a plurality of different sources and use the systems and methods described herein to identify an upcoming extreme weather condition for a geographical region.

At step 406, based on the location identifier, the system identifies a particular structure location from among the plurality of different structure locations, the particular structure location being within the particular geographic region. For example, the system may control a plurality of different sites in various locations. The system may determine if any the controlled sites are within the particular geographical region. As a practical example, if an earthquake has been predicted for the area code of 91406, the system may determine if any of sites are within the area code of 91406. Additionally or alternatively, the system may only identify extreme weather conditions for geographical regions associated with one or more of the sites. For instance, if the system only stores policy data for a first site in the 91406 area code and a second and third site in the 95124 area code, the system may only request forecasts for the 91406 area code and the 95124 area code. If an extreme weather condition is identified for the 91406 area code, the system may identify the first site.

At step 408, based on the particular structure location, a particular policy dataset is selected from among the policy datasets. For example, the system may identify a policy associated with the particular structure location or a policy associated with a plurality of locations including the particular structure location, such as a client's policy for each location. Additionally or alternatively, the system may select a policy associated with a particular type of extreme weather condition. For example, if a first policy for a structural location identifies extreme heat conditions while a second policy for the structural location identifies a catastrophic event, the system may select the catastrophic event policy when the then-current weather condition is a tornado.

At step 410, the system transforms the particular policy dataset into a plurality of specific HVAC equipment instructions, based on stored HVAC configuration data specifying equipment types of HVAC equipment on the particular structure location. For example, the system may transform a policy which reduces the maximum temperature in a structure into HVAC equipment instructions which, when executed by one or more processors, cause the HVAC equipment at the particular structure location to execute a cooling action when a measured internal temperature is greater than the reduced maximum temperature. The instructions may be configured based on data stored at the system identifying types of HVAC equipment at the particular location such that the instructions can be executed to control the HVAC equipment at the particular location.

At step 412, the system transmits, over a network, the specific HVAC equipment instructions to HVAC equipment at the particular structure location which, when executed, cause the HVAC equipment at the particular structure location to execute a heating action, cooling action, or fan action in accordance with the particular policy. For example, the energy management service unit 130 may send instructions to one or more energy management devices at a particular site which execute the instructions to implement a policy of the particular policy dataset. The heating action, cooling action, or fan action may include setting new set points for an HVAC system such as new maximum temperatures or minimum temperatures which cause the HVAC system to initiate heating or cooling actions more often or less often than would have been performed used the old set points. The heating action or cooling action may additionally or alternatively include increasing a magnitude of heating or cooling actions. The fan action may include starting or stopping fans in the HVAC system. Additionally or alternatively, the actions may include shutting off HVAC systems or making HVAC systems inoperable to preserve energy during catastrophic events.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
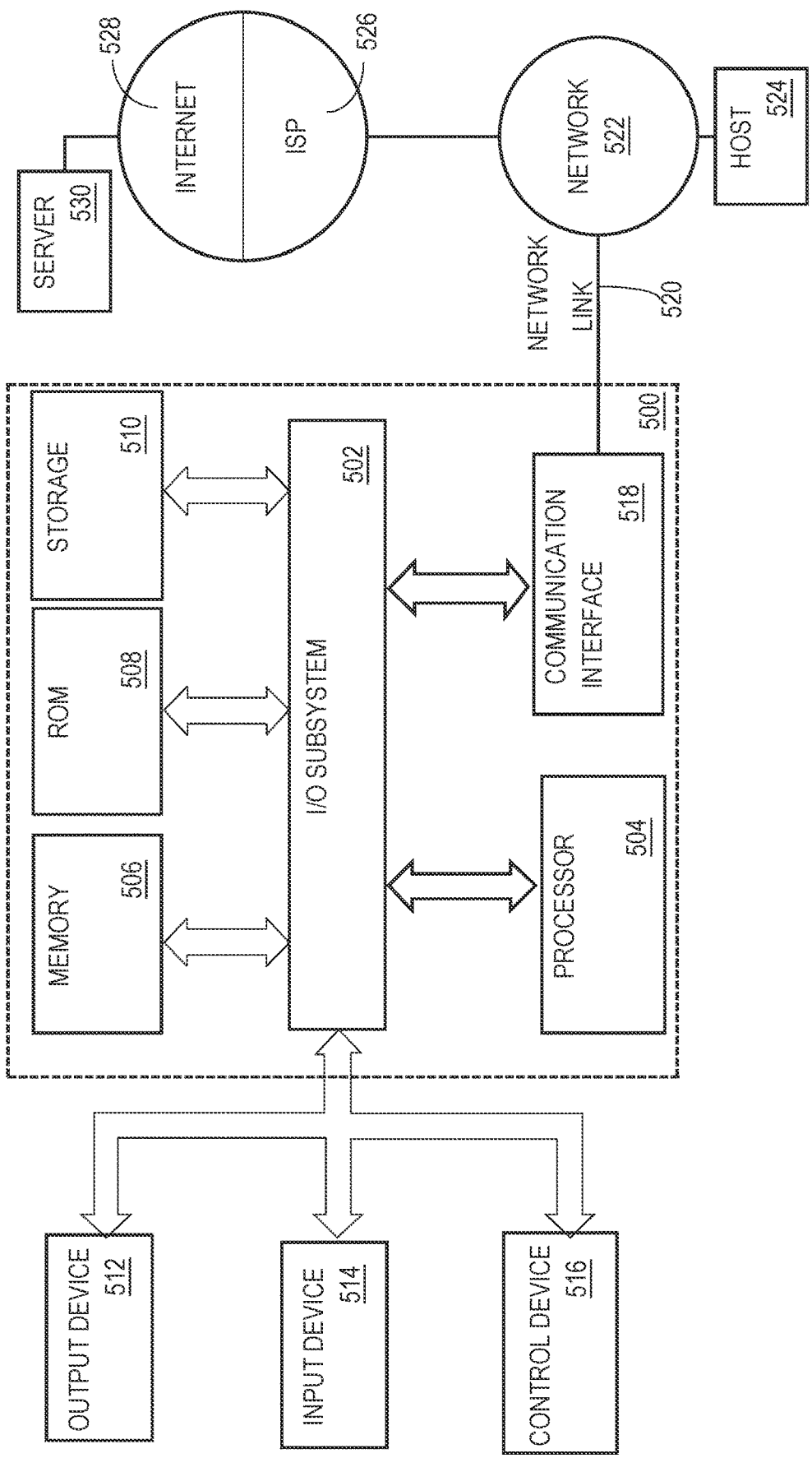
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    storing, at a server computer, multiple different pre-defined policy datasets each representing heating, ventilation and air conditioning (HVAC) control policy for a plurality of different structure locations and one or more different extreme weather conditions;
    while storing the pre-defined policy datasets, receiving weather condition data comprising a condition identifier of a then-current extreme weather condition in association with a location identifier specifying a particular geographical region, wherein the then-current extreme weather condition is one of the one or more different extreme weather conditions and is associated with one of the pre-defined policy datasets;
    based on the location identifier, identifying a particular structure location from among the plurality of different structure locations, the particular structure location being within the particular geographical region that is determined based on the weather condition data;
    selecting a particular pre-defined policy dataset, from among the pre-defined policy datasets, that corresponds to the particular structure location;
    transforming the particular pre-defined policy dataset into a plurality of specific HVAC equipment instructions, based on stored HVAC configuration data specifying equipment types of HVAC equipment at the particular structure location;
    transmitting, over a network to HVAC equipment at the particular structure location, the specific HVAC equipment instructions which, when executed, cause the HVAC equipment at the particular structure location to execute a heating action, cooling action or fan action in accordance with the particular pre-defined policy dataset.

2. The method of claim 1, wherein the heating action, cooling action, or fan action comprises making HVAC equipment at the particular structure location inoperable.

3. The method of claim 1, further comprising:
determining that the then-current extreme weather condition comprises an intensity greater than a first value but lower than a second value;
wherein selecting the particular pre-defined policy dataset is based, at least in part, on the intensity of the then-current extreme weather condition being greater than the first value but lower than the second value;
receiving second weather condition identifying a second then-current extreme weather condition in association with a second location identifier specifying the particular geographical region;
determining that the second weather condition comprises an intensity greater than the second value;
based, at least in part, on the particular structure location and intensity of the second then-current extreme weather condition being greater than the second value, selecting a second pre-defined policy dataset from among the pre-defined policy datasets, the second pre-defined policy dataset being different than the particular pre-defined policy dataset;
transforming the second pre-defined policy dataset into a plurality of second specific HVAC equipment instructions, based on the stored HVAC configuration data;
transmitting, over the network to the HVAC equipment at the particular structure location, the second specific HVAC equipment instructions which, when executed, cause the HVAC equipment at the particular structure location to execute a second heating action, cooling action or fan action in accordance with the second pre-defined policy dataset.

4. The method of claim 1, further comprising:
sending, to a client computing device, data identifying the then-current extreme weather condition, the particular structure location, and the particular pre-defined policy dataset;
receiving, from the client computing device, a selection of the particular pre-defined policy dataset;
in response to receiving the selection, performing the transmitting of the specific HVAC equipment instructions to the HVAC equipment at the particular structure location.

5. The method of claim 4, further comprising:
causing displaying, on the client computing device, a graphical user interface comprising identifiers of a plurality of structure locations;
causing displaying, through the graphical user interface, for each of the plurality of structure locations, an identifier of a then-current extreme weather condition and an identifier of a corresponding pre-defined policy dataset;
receiving the selection of the particular pre-defined policy dataset through the graphical user interface.

6. The method of claim 1, further comprising:
determining, based on the weather condition data, a likelihood of occurrence of the then-current extreme weather condition;
sending, to a client computing device, data identifying the then-current extreme weather condition, the particular structure location, the likelihood of occurrence of the then-current extreme weather condition and the particular pre-defined policy dataset;
receiving, from the client computing device, a selection of the particular pre-defined policy dataset;
in response to receiving the selection, performing the transmitting of the specific HVAC equipment instructions to the HVAC equipment at the particular structure location.

7. The method of claim 6, further comprising:
storing first previous forecast data for a plurality of previous forecasts, the first previous forecast data comprising, for each previous forecast of the plurality of previous forecasts, an identifier of an extreme weather condition, an identifier of a source of the previous forecast, and a lead time value indicating an amount of time between a time of the previous forecast and a forecasted time of the extreme weather condition;
storing second previous forecast data for the plurality of previous forecasts, the second previous forecast data comprising, for each previous forecast of the plurality of previous forecasts, a value indicating whether the previous forecast was accurate in forecasting occurrence of the extreme weather condition;
training a machine learning system using the first previous forecast data as inputs and the second previous forecast data as outputs;
wherein determining the likelihood of occurrence of the then-current extreme weather condition comprises identifying a source of the weather condition data and a particular lead time of the weather condition data and computing, using the source of the weather condition data, the particular lead time of the weather condition data, and the condition identifier as inputs into the machine learning system, the likelihood of occurrence of the then-current extreme weather condition.

8. The method of claim 1, further comprising:
determining, based on the weather condition data, a likelihood of occurrence of the then-current extreme weather condition;
determining that the likelihood of occurrence of the then-current extreme weather condition is greater than a stored threshold value and, in response, performing the transmitting of the specific HVAC equipment instructions to the HVAC equipment at the particular structure location.

9. The method of claim 8, further comprising:
storing first previous forecast data for a plurality of previous forecasts, the first previous forecast data comprising, for each previous forecast of the plurality of previous forecasts, an identifier of an extreme weather conditions, and a lead time value indicating an amount of time between a time of the previous forecast and a forecasted time of the extreme weather condition;
storing second previous forecast data for the plurality of previous forecasts, the second previous forecast data comprising, for each previous forecast of the plurality of previous forecasts, a value indicating whether the previous forecast was accurate in forecasting occurrence of the extreme weather condition;
training a machine learning system using the first previous forecast data as inputs and the second previous forecast data as outputs;
wherein determining the likelihood of occurrence of the then-current extreme weather condition comprises identifying a particular lead time of the weather condition data and computing, using the particular lead time of the weather condition data, and the condition identifier as inputs into the machine learning system, the likelihood of occurrence of the then-current extreme weather condition.

10. A system comprising:
one or more processors;
a memory, storing instructions which, when executed by the one or more processors, causes performance of:
storing multiple different pre-defined policy datasets each representing heating, ventilation and air conditioning (HVAC) control policy for a plurality of different structure locations and one or more different extreme weather conditions;
while storing the pre-defined policy datasets, receiving weather condition data comprising a condition identifier of a then-current extreme weather condition in association with a location identifier specifying a particular geographical region, wherein the then-current extreme weather condition is one of the one or more different extreme weather conditions and is associated with one of the pre-defined policy datasets;
based on the location identifier, identifying a particular structure location from among the plurality of different structure locations, the particular structure location being within the particular geographical region determined by the weather condition data;
selecting a particular pre-defined policy dataset, from among the pre-defined policy datasets, that corresponds to the particular structure location;
transforming the particular pre-defined policy dataset into a plurality of specific HVAC equipment instructions, based on stored HVAC configuration data specifying equipment types of HVAC equipment at the particular structure location;
transmitting, over a network to HVAC equipment at the particular structure location, the specific HVAC equipment instructions which, when executed, cause the HVAC equipment at the particular structure location to execute a heating action, cooling action or fan action in accordance with the particular pre-defined policy dataset.

11. The system of claim 10, wherein the heating action, cooling action, or fan action comprises making HVAC equipment at the particular structure location inoperable.

12. The system of claim 10, wherein the instructions, when executed by the one or more processors, cause performance of:
determining that the then-current extreme weather condition comprises an intensity greater than a first value but lower than a second value;
wherein selecting the particular pre-defined policy dataset is based, at least in part, on the intensity of the then-current extreme weather condition being greater than the first value but lower than the second value;
receiving second weather condition identifying a second then-current extreme weather condition in association with a second location identifier specifying the particular geographical region;
determining that the second weather condition comprises an intensity greater than the second value;
based, at least in part, on the particular structure location and intensity of the second then-current extreme weather condition being greater than the second value, selecting a second pre-defined policy dataset from among the pre-defined policy datasets, the second pre-defined policy dataset being different than the particular pre-defined policy dataset;
transforming the second pre-defined policy dataset into a plurality of second specific HVAC equipment instructions, based on the stored HVAC configuration data;
transmitting, over the network to the HVAC equipment at the particular structure location, the second specific HVAC equipment instructions which, when executed, cause the HVAC equipment at the particular structure location to execute a second heating action, cooling action or fan action in accordance with the second pre-defined policy dataset.

13. The system of claim 10, wherein the instructions, when executed by the one or more processors, further causes performance of:
sending, to a client computing device, data identifying the then-current extreme weather condition, the particular structure location, and the particular pre-defined policy dataset;
receiving, from the client computing device, a selection of the particular pre-defined policy dataset;
in response to receiving the selection, performing the transmitting of the specific HVAC equipment instructions to the HVAC equipment at the particular structure location.

14. The system of claim 13, wherein the instructions, when executed by the one or more processors, further cause performance of:
causing displaying, on the client computing device, a graphical user interface comprising identifiers of a plurality of structure locations;
causing displaying, through the graphical user interface, for each of the plurality of structure locations, an identifier of a then-current extreme weather condition and an identifier of a corresponding pre-defined policy dataset;
receiving the selection of the particular pre-defined policy dataset through the graphical user interface.

15. The system of claim 10, wherein the instructions, when executed by the one or more processors, further cause performance of:
determining, based on the weather condition data, a likelihood of occurrence of the then-current extreme weather condition;
sending, to a client computing device, data identifying the then-current extreme weather condition, the particular structure location, the likelihood of occurrence of the then-current extreme weather condition and the particular pre-defined policy dataset;
receiving, from the client computing device, a selection of the particular pre-defined policy dataset;
in response to receiving the selection, performing the transmitting of the specific HVAC equipment instructions to the HVAC equipment at the particular structure location.

16. The system of claim 15, wherein the instructions, when executed by the one or more processors, further cause performance of:
storing first previous forecast data for a plurality of previous forecasts, the first previous forecast data comprising, for each previous forecast of the plurality of previous forecasts, an identifier of an extreme weather condition, an identifier of a source of the previous forecast, and a lead time value indicating an amount of time between a time of the previous forecast and a forecasted time of the extreme weather condition;
storing second previous forecast data for the plurality of previous forecasts, the second previous forecast data comprising, for each previous forecast of the plurality of previous forecasts, a value indicating whether the previous forecast was accurate in forecasting occurrence of the extreme weather condition;

training a machine learning system using the first previous forecast data as inputs and the second previous forecast data as outputs;
wherein determining the likelihood of occurrence of the then-current extreme weather condition comprises identifying a source of the weather condition data and a particular lead time of the weather condition data and computing, using the source of the weather condition data, the particular lead time of the weather condition data, and the condition identifier as inputs into the machine learning system, the likelihood of occurrence of the then-current extreme weather condition.

17. The system of claim 10, wherein the instructions, when executed by the one or more processors, further cause performance of:
determining, based on the weather condition data, a likelihood of occurrence of the then-current extreme weather condition;
determining that the likelihood of occurrence of the then-current extreme weather condition is greater than a stored threshold value and, in response, performing the transmitting of the specific HVAC equipment instructions to the HVAC equipment at the particular structure location.

18. The system of claim 17, wherein the instructions, when executed by the one or more processors, further cause performance of:
storing first previous forecast data for a plurality of previous forecasts, the first previous forecast data comprising, for each previous forecast of the plurality of previous forecasts, an identifier of an extreme weather conditions, and a lead time value indicating an amount of time between a time of the previous forecast and a forecasted time of the extreme weather condition;
storing second previous forecast data for the plurality of previous forecasts, the second previous forecast data comprising, for each previous forecast of the plurality of previous forecasts, a value indicating whether the previous forecast was accurate in forecasting occurrence of the extreme weather condition;
training a machine learning system using the first previous forecast data as inputs and the second previous forecast data as outputs;
wherein determining the likelihood of occurrence of the then-current extreme weather condition comprises identifying a source of the weather condition data and a particular lead time of the weather condition data and computing, using the particular lead time of the weather condition data, and the condition identifier as inputs into the machine learning system, the likelihood of occurrence of the then-current extreme weather condition.

* * * * *